United States Patent [19]

Gazeley

[11] Patent Number: 4,973,148
[45] Date of Patent: Nov. 27, 1990

[54] OPTICAL ACCESSORY FOR USE WITH SPECTACLES

[75] Inventor: Albert E. Gazeley, San Po Kong, Hong Kong

[73] Assignee: Polaroid Corporation, Cambridge, Mass.

[21] Appl. No.: 706,481

[22] Filed: Feb. 28, 1985

[51] Int. Cl.⁵ .............................................. G02C 9/00
[52] U.S. Cl. ....................................... 351/47; 351/57; 351/44
[58] Field of Search ................... 351/41, 44, 47, 52, 351/57, 58, 59, 124, 130, 138

[56] References Cited

U.S. PATENT DOCUMENTS

| | | | |
|---|---|---|---|
| D. 197,305 | 1/1964 | Magnuson et al. | D57/1 |
| 716,194 | 12/1902 | Conn . | |
| 1,348,713 | 8/1920 | Gitterman . | |
| 2,159,710 | 5/1939 | Reichert | 88/41 |
| 2,580,859 | 1/1952 | Steckler | 88/41 |
| 2,602,372 | 7/1952 | Passet | 88/41 |
| 2,607,919 | 8/1952 | Stegeman | 2/14 |
| 2,696,141 | 12/1954 | Hurst | 88/43 |
| 2,949,609 | 8/1960 | Sager | 2/13 |
| 2,976,767 | 3/1961 | McNeill | 88/41 |
| 2,981,956 | 5/1961 | Thompson | 2/13 |
| 3,092,838 | 6/1963 | Vacha | 2/12 |
| 3,238,005 | 3/1966 | Petitto | 351/59 |
| 3,345,121 | 10/1967 | DeAngelis | 351/130 |
| 3,453,042 | 7/1969 | Cooper | 351/86 |
| 3,555,563 | 1/1971 | Grossman | 2/14 |
| 3,604,013 | 9/1971 | Hammond | 2/13 |
| 3,741,634 | 6/1973 | Stoltze | 351/57 |
| 3,890,037 | 6/1975 | Zingarelli | 351/47 |
| 3,944,346 | 3/1976 | Shindler | 351/49 |
| 3,958,867 | 5/1976 | Morgan | 351/47 |
| 3,981,569 | 9/1976 | Morgan | 351/47 |
| 4,012,129 | 3/1977 | Byler | 351/46 |
| 4,176,921 | 12/1979 | Matthias | 351/106 |
| 4,217,037 | 8/1980 | Lemelson | 351/44 |
| 4,247,178 | 1/1981 | Cook | 351/47 |
| 4,253,745 | 3/1981 | Bizzarri | 351/45 |
| 4,322,138 | 3/1982 | Minart | 351/155 |
| 4,338,004 | 7/1982 | Vosper | 351/47 |
| 4,402,577 | 9/1983 | Minart | 351/125 |
| 4,402,578 | 9/1983 | Minart | 351/140 |
| 4,405,214 | 9/1983 | Bolle | 351/88 |
| 4,504,127 | 3/1985 | Cottet | 351/86 |

FOREIGN PATENT DOCUMENTS 2138592 4/1984 United Kingdom .

OTHER PUBLICATIONS

Optical Journal and Review of Optometry, vol. XCL, No. 7, Apr. 1, 1954, p. 55.

*Primary Examiner*—Paul M. Dzierzynski
*Attorney, Agent, or Firm*—Edward S. Roman; Leslie J. Payne

[57] ABSTRACT

There is disclosed an improved optical accessory of the sun shade type for use with a pair of prescription spectacles. The accessory includes releaseable securing structure which releaseably cooperates with a bridge assembly of the spectacles to inhibit movement of the accessory relative thereto.

16 Claims, 2 Drawing Sheets

OPTICAL ACCESSORY FOR USE WITH SPECTACLES

BACKGROUND OF THE INVENTION

Optical accessories for use in combination with spectacles exist for a wide variety of reasons. Sunglass accessories, for instance, generally permit optimum use of the spectacles under varying lighting conditions. Other optical accessories provide, for example, eye shielding and vision correcting functions.

A number of factors are considered important in constructing such accessories. In this regard, it is desirable to have the optical elements of the accessory positioned in correct superposed relationship to the optical members of spectacles for proper usage and convenience. In many instances, it is highly desirable to avoid unnecessary movement of the accessory relative to the spectacle frame assembly. Moreover, facilitating quick, easy and reliable mounting and demounting of the accessory are of practical importance. Significantly, it is desirable to have these mounting arrangements as aesthetic as possible. Unaesthetic mounting arrangements, of course, detract appreciably from the commercial appeal of such accessories. Furthermore, in the highly competitive spectacle accessory field, need exists to provide the foregoing features as simply, economically and efficiently as possible.

Mounting arrangements for releasably attaching optical accessories to spectacle frames are significant components of the accessories. The following are exemplary of prior art optical accessories and their releasable mounting arrangements: 2,580,859; 2,607,919; 2,696,141; 2,949,609; 2,981,956; 3,092,838; 3,345,121; 3,555,563; 3,604,013; 3,741,634; 4,012,129; 4,176,921; 4,253,745; 4,402,577; 4,402,578; and 4,405,214.

Known optical accessories exhibit a number of deficiencies in connection with the foregoing enumerated design factors. Moreover, most accessories must have specially constructed frames to be attached to. Accordingly, the accessories are not compatible with many kinds of existing frames. Furthermore, these specially constructed spectacles often appear unattractive whether the accessories are attached or removed.

SUMMARY OF THE INVENTION

It is an object of the present invention to provide an improved optical accessory for use in combination with spectacles.

In this regard, the optical accessory is for use with spectacles of the type having a pair of optical elements and means for bridging and holding the optical elements in spaced apart relationship. Such means has surfaces intermediate the optical elements which are cooperable with a releasable attaching means. The accessory includes a pair of optical elements, and means for connecting the optical members in spaced apart relationship so that each is adapted to be in superposed relation with a respective one of the optical elements. An arrangement is provided for releasably attaching the accessory to the cooperable surfaces. Moreover, means are provided for blocking the view of the cooperable surfaces and the releasable attaching means from the front of the spectacles when the accessory is attached.

Another object of the present invention is to provide an optical accessory for use with spectacles of the type including a pair of optical elements, and means for bridging and holding the optical elements in spaced apart relationship as well as for having surfaces intermediate the optical elements which define a frame opening. The accessory comprises a pair of optical members; means for connecting the optical members in spaced apart relationship so that each is adapted to be in superposed relation with a respective one of the spectacles optical elements. Included is means for yieldably biasing the accessory to the frame opening surfaces so as to provide a releasable connection therewith which prevents substantially movement of the accessory in all directions in a plane defined by the opening and for limiting movement in directions generally transverse to the plane, when the accessory is attached.

Among the other objects of the invention are therefore the provision of an improved optical accessory for use in combination with spectacles wherein the accessory is easily attached and detached therefrom; the provision of an improved optical accessory having releasable securing means which are hidden from view when attached to the spectacles; the provision of an improved optical accessory which is accurately positioned and securely mounted to inhibit undesired relative movement of the accessory with respect to the spectacles; the provision of an optical accessory having an improved mounting arrangement which is simple in construction and economical to manufacture; and, the provision of an optical accessory which is compatible with a large number of frames.

Other objects and further scope of applicability of the present invention will become apparent from the detailed description to follow when taken in conjunction with the accompanying drawings in which like parts are designated by the reference numerals.

BRIEF DESCRIPTION OF THE DRAWINGS

FIG. 5 is a fragmented elevational view better showing other details of the accessory structure.

DETAILED DESCRIPTION

Figure 1:
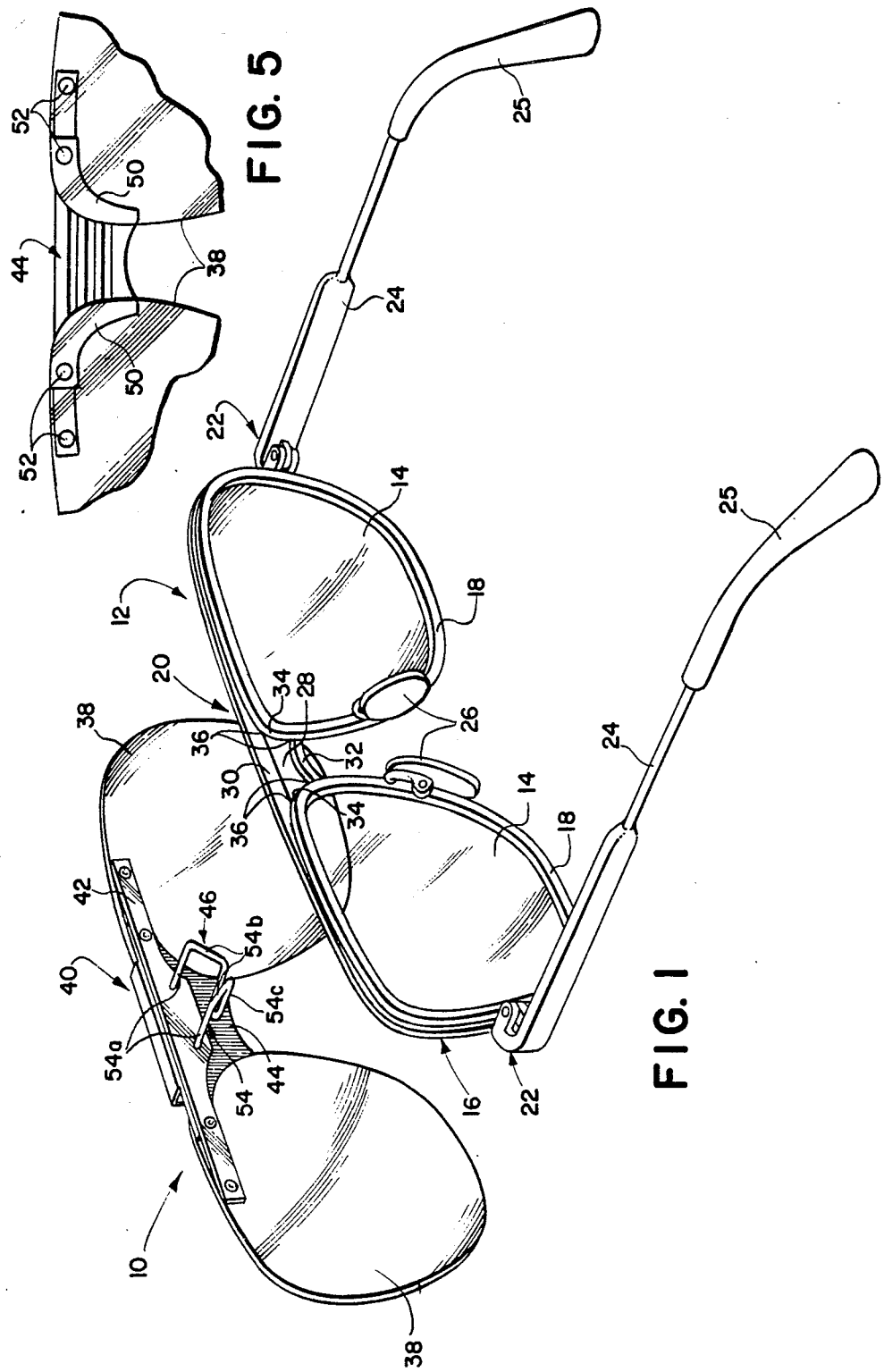
FIG. 1 is an exploded perspective view of the improved optical accessory of the present invention shown in combination with a pair of spectacles.

Reference is now made to the drawings for showing the improved optical accessory 10 of the present invention for use with a pair of spectacles 12, such as of the type shown in FIG. 1. In this embodiment, the optical accessory can be of the sun shade type.

As illustrated, the spectacles 12 can be of the prescription glasses type and include prescription lenses 14 which are secured to a frame assembly 16. Other optical elements could, of course, be used instead. In particular, the frame assembly 16 is a conventional wire-framed type and includes a pair of lens frames 18. These lens frames 18 are spaced apart and connected by a central bridging assembly 20. Attached as by temple hinges and lugs, generally indicated at 22, to outward lateral sides of the lens frames 18 are conventional temple pieces 24 which have ear tips 25 engageable with the ears of a wearer. Attached to inward lateral sides of the lens frames 18 is a pair of conventional opposing nose pads 26.

Reference is again made to the central bridging assembly 20 which in the present embodiment includes a central opening 28, in part, defined by a brow bar and nose bridge 30 and 32; respectively which are generally horizontally extending and spaced apart from each other. Also defining the central opening 28 are generally vertical portions 34 of the lens frames 18 extending between the brow bar and nose bridge 30, 32, respectively. The brow bar 30, nose bridge 32 and the vertical portions 34 converge to define retaining corners 36. Although the illustrated embodiment depicts the central opening 28 having four-sides defined by the brow bar 30, nose bridge 32, and vertical portions 34, it will be appreciated that such a central opening 28 can be formed from other structural features so long as such structure provides an opening similar in structure and function to opening 28.

Figure 3:
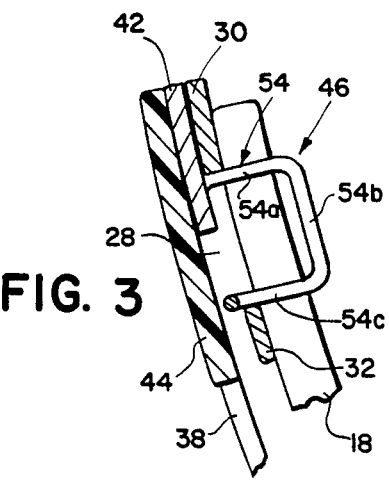
FIG. 3 is a cross-sectional view taken along section-line 3—3 appearing in FIG. 2.
Figure 4:
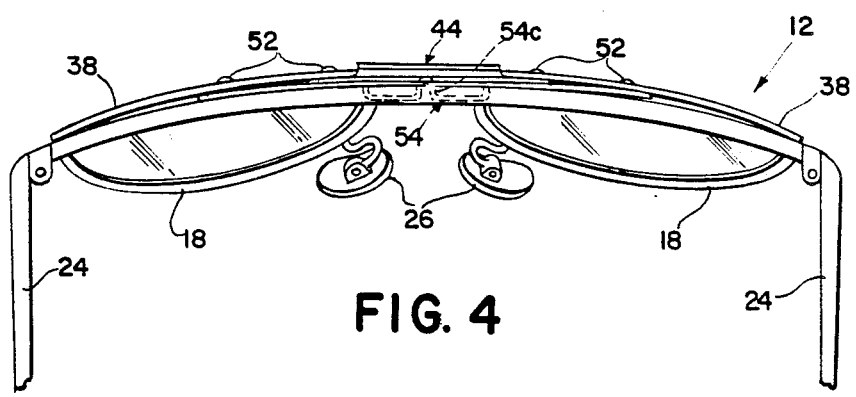
FIG. 4 is a view showing cooperation between the spectacles and the accessory.

Reference is now made to FIGS. 1, 3 and 4 for showing the optical accessory 10. Included in the optical accessory 10 is a pair of spaced apart and adjacent sun shade type optical elements 38 made of a suitable plastic material. The optical elements 38 are held in a horizontally space apart orientation by a connecting assembly 40. In this embodiment, the connecting assembly 40 includes an elongated and resilient metallic backing bar 42, lens retaining segment 44 made of resilient plastic material, and releasable attaching means 46 integral with the backing bar 42. The lens retaining segment 44 defines a pair of spaced apart and arcuately shaped recessed shouldered portions 50 upon which peripheral portions of the optical elements 38 are supported in abutting relationship. The outer pair of plastic rivets 552 secure the backing bar 42 to the optical elements 38 while the inner pair secure the backing bar 42 to both the optical elements and the lens retaining segment 44, as shown in FIG. 5. In this fashion, the optical elements 38 are firmly maintained in a fixed and spaced apart relationship and the accessory 10 is a self-supporting and resilient member. The lens retaining segment 44 is opaque. This is for hiding from view, the releasable attaching means 46 which is attached to the backside thereof as well as the spectacle surfaces to which it is attached. Hence, aesthetics of the optical accessory 10 is enhanced since the attaching means 46 is not seen when the accessory 10 is worn.

Figure 2:
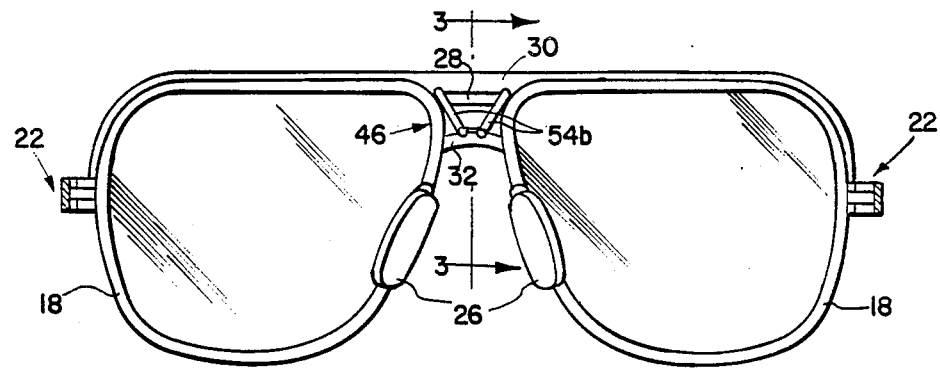
FIG. 2 is an elevational view showing structure forming the releasable connection between the accessory and the spectacles.

Reference is now made in particular to FIGS. 1–3 for showing the releasable attaching means 46. In this embodiment, the attaching means 46 is formed by a resiliently deformable, unitary wire-like, retaining member 54 which has a snap-fit connection to the spectacles. More particularly, the retaining member 54 has a rounded cross-section and its opposite end portions 54a extend rearwardly and generally perpendicularly from the backing bar 42. In this embodiment the end portions 54a are adapted to snugly and resiliently engage the retaining corners 36. The releasable retaining member 54 has two generally converging and descending portions 54b. Corners are formed by the junction of portions 54a,b which corners are in general alignment with retaining corners formed by the bridge assembly. The portions 54b merge together in a laterally forwardly extending and generally U-shaped tongue-like portion 54c. Such a merging of portions 54b,c form another set of corners. The tongue portion 54c is configured to have a snap-fit cooperation with the nose bridge 32, much as in the manner indicated in FIG. 3. The releasable retaining member 54, when joined to the bridging assembly 20 through the central opening 28, provides a three point type of resiliently firm snap-fit engagement. For effecting this resilient engagement the configuration of the retaining member 54, in the unstressed condition, is slightly larger than the dimension of the central opening 28. Thus, when, the retaining member 54 is inserted through the opening 28, the former deforms resiliently, and as it attempts to return to its unstressed condition creates a resiliently tight or yieldably biased engagement which restricts movement of the accessory 10. Because of the configuration of the retaining member, the tongue section 54c is in tight resilient engagement with the nose bridge 32 while the end portions 54a are tightly and resiliently bearing against the retaining corners 36. The tongue section 54c during insertion will cause a compression of the retaining member 54 and serves to transmit the force of the nose bridge thereon through the retaining member to urge the portions 54a into alignment with the retaining corners. Although the portions 54a resiliently deform to form a snap-fit connection, it is within the present invention to have the portions 54a have a snug-fit with the corners 36 or be constructed such that they are displaced into engagement with the corners when the retaining member 54 is compressed during insertion. Although in this embodiment, the tongue section 54c engages the nose bridge, it can contact the brow bar, providing of course, that the portions 54a engage an opposite pair of retaining corners to form said three-part engagement. As a result of the foregoing the optical accessory 10 when attached is prevented substantially from movement horizontally, vertically and rotationally in a plane defined by the opening. The optical accessory 10 is, when assembled, unable to move transversely to the central bridging assembly 20. Accordingly, the optical accessory 10 is securely and correctly positioned as well as is easily insertable and removable from the spectacles 12.

FIG. 4 shows another aspect of the present invention. This takes advantage of the resilient nature of the accessory 10. In this regard, portions of each of the sunshades are configured and arranged to engage respective lens frames 18 in the general vicinity of their furthermost spaced apart portion when accessory 10 is releasably attached to the spectacles 12 to act in a spring-like manner, at such time, so as to exert a yieldably resilient force on the snap-fit connection in a direction away from the spectacles, thereby further urging the accessory into a tight fit. Such an arrangement is effective to limit any play in the snap-fit connection. Hence, a more stable position for the accessory 10 is achievable.

Although the releasably retaining member 54 has the configuration shown, it will be appreciated that more than a single member might be used provided they would substantially prevent horizontal, vertical and rotational movement of the accessory 10 in the plane of the opening and restrict movement of the accessory 10 transverse to the plane of the opening, when attached.

Since certain changes may be made in the abovedescribed accessory without departing from the scope of the invention herein involved, it is intended that all matter contained in the description or shown in the accompanying drawings shall be interpreted as illustrative and not in a limiting sense.

What is claimed is:

1. An optical accessory for releasable attachment to a spectacle of the type including a pair of optical elements, and means for bridging and holding the optical elements in spaced apart relationship and for defining an opening intermediate the optical elements and defined at least, in part, by surfaces which form at least two generally horizontally spaced apart corners and at least a surface spaced from the corners; said accessory comprising a pair of optical members; means for connecting said optical members in spaced apart relationship so that each is adapted to be in superposed relation with a respective one of the optical elements, and means entirely integral with said connection means for having a snap-fit releasable connection with the corners and spaced surface to substantially limit movement of said accessory in all directions in a general plane defined by the opening and for limiting movement in a direction generally transverse to the plane when said accessory has a snap-fit with the surfaces defining the opening wherein said connecting means includes an opaque assembly which substantially covers the opening when said accessory is releasably secured to the spectacle and said releasable snap-fit means is attached to a side of said opaque assembly which faces towards a wearer when said opaque assembly covers the opening so that said releasable snap-fit means is hidden from view.

2. A sun shade device for releasable attachment to prescription glasses, the prescription glasses comprising a pair of lenses, a pair of lens frames each mounting one of the lenses, a brow bar and a nose bridge, the brow bar and nose bridge serving to space the lenses apart and cooperating with a section of each of the lens frames to define a four-sided opening of the prescription glasses, said sun shade device including;

a pair of sun shades;

means for connecting the pair of sun shades together in spaced apart prientation;

means for releasably attaching said sun shade device to the prescription glasses with said pair of sun shades positioned over respective ones of the lenses, said attaching means including a single continuous wire-like member which extends outward from said connector means configured and arranged to be inserted through the opening of the prescription glasses to effect a snap-fit connection between the brow bar and nose bridge and to engage the four sides of that opening to substantially preclude movement of said sun shade device relative to the precription glasses in any direction along the general plane of that opening.

3. The sun shade device of claim 2 wherein said wire-like member includes opposite ends attached to said connecting means and extends rearwardly therefrom to make respective substantially right angle turns to define a pair of first corners and then respective reverse substantially right angle turns to define a pair of second corners, and then defines a middle forwardly extending U-shaped tongue-like portion, said second corners serving to snap-fit with one of the brow bar or nose bridge with the force exerted on said U-shaped tongue-like portion by the other of the brow bar or nose bridge acting through said wirelike member to increase the strength of said snap-fit connection.

4. The sun shade device of claim 3 wherein said pair of first corners of said wire-like member are aligned with respective corners of the opening in the prescription glasses defined by one of the lens frame sections and one of the brow bar or nose bridge, whichever is not in contact with said U-shaped tongue-like portion of said wire-like member, and the force exerted on said U-shaped tongue-like portion by the other of the brow bar or nose bridge acts through said wire-like member to urge said first corners thereof into the respectively aligned corners of the prescription glasses opening.

5. The sun shade device of claim 2 wherein said device is configured and arranged for said sun shades to engage respective lens frames of the prescription glasses in the general vicinity of their furthermost spaced apart portions when said sun shade device is releasably attached to the prescription glasses by said attaching means, and to act through said connecting means in a spring-like manner at such time to exert a yieldably resilient force on the snap-fit connection between said sun shade device and the prescription glasses in a direction away from the prescription glasses.

6. The invention comprising: an optical accessory in combination with spectacles, said spectacles including a pair of optical elements, and means for bridging and holding said optical elements in spaced apart relationship and for having surfaces intermediate said optical elements defining a frame opening, said accessory comprising a pair of optical members; means for connecting said optical members in spaced apart relationship so that each is adapted to be in superposed relation with a respective one of said optical elements and means entirely integral with said connecting means for releasably and yieldably biasing said accessory to said frame opening surfaces such that when said accessory is attached to said frame opening surfaces there is substantially no movement of said accessory in all directions in a plane defined by said frame opening and in directions generally transverse to said frame opening.

7. The invention comprising: an optical accessory in combination with spectacles, said spectacles including a pair of optical elements, and means for bridging and holding said optical elements in spaced apart relationship and for defining an opening intermediate said optical elements and defined at least, in part, by surfaces which form at least two generally horizontally spaced apart corners and at least a surface spaced from said corners; said accessory comprising a pair of optical members; means for connecting said optical members in spaced apart relationship so that each is adapted to be in superposed relation with a respective one of said optical elements, and means entirely integral with said connecting means for having a snap-fit releasable connection with said corners and said spaced surface to substantially limit movement of said accessory in all directions in a general plane defined by said opening and for limiting movement in a direction generally transverse to the plane when said accessory has a snap-fit with said surfaces defining said opening.

8. The invention of claim 7 wherein: said releasable snap-fit means comprises at least a pair of first resilient portions adapted to resiliently and retainingly cooperate with a respective one of said corners, and a second resilient portion adapted to resiliently and retainingly cooperate with said surfaces defining said opening when said releasable snap-fit means is snap-fit to said spectacles.

9. The invention of claim 8 wherein: said snap-fit means includes a pair of portions which converge toward and merge into said second resilient portion.

10. The invention of claim 7 wherein: said connecting means includes an opaque assembly which substantially covers said opening when said accessory is releasably secured to said spectacles and said releasable snap-fit means is attached to a side of said opaque assembly which faces towards a wearer when said opaque assembly covers said opening so that said releasable snap-fit means is hidden from view.

11. The invention comprising: a sun shade device in combination with prescription glasses, said prescription glasses comprising a pair of lenses, a pair of lens frames each mounting one of said lenses, a brow bar and a nose bridge, said brow bar and nose bridge serving to space said lenses apart and cooperating with a section of each of said lens frames to define a four-sided opening of said prescription glasses, said sun shade device including a pair of sun shades; means for connecting said pair of sun shades together in spaced apart orientation; means for releasably attaching said sun shade device to said prescription glasses with said pair of sun shades positioned over respective ones of said lenses, said attaching means including a wire-like member configured and arranged to be inserted through said opening of said prescription glasses to effect a snap-fit connection with one of said brow bar or nose bridge and to engage said four sides of said opening to substantially preclude movement of said sun shade device relative to said prescription glasses in any direction along the general plane of said opening.

12. The invention of claim 11 wherein: said wire-like member includes opposite ends attached to said connecting means and extending rearwardly therefrom to make respective substantially right angle turns to define a pair of first corners and then respective reverse substantially right angle turns to define a pair of second corners, and then defines a middle forwardly extending U-shaped tongue-like portion, said second corners serving to snap-fit with one of said brow bar or nose bridge with the force exerted on said U-shaped tongue-like portion by the other of said brow bar or nose bridge acting through said wire-like member to increase the strength of said snap-fit connection.

13. The invention of claim 12 wherein: said pair of first corners of said wire-like member are aligned with respective corners of said opening in said prescription glasses defined by one of said lens frame sections and one of said brow bar or nose bridge, whichever is not in contact with said U-shaped tongue-like portion of said wire-like member, and the force exerted on said U-shaped tongue-like portion by the other of said brow bar or nose bridge acts through said wire-like member to urge said first corners thereof into respectively aligned corners of said prescription glasses opening.

14. The invention of claim 11 wherein: said device is configured and arranged for said sun shades to engage respective lens frames of said prescription glasses in the general vicinity of their furthermost spaced apart portions when said sun shade device is releasably attached to said prescription glasses by said attaching means, and to act through said connecting means in a spring-like manner at such time to exert a yieldably resilient force on said snap-fit connection between said sun shade device and said prescription glasses in a direction away from said prescription glasses.

15. A sun shade device for use with prescription glasses, the prescription glasses comprising a pair of lenses, a pair of lens frames each mounting one of the lenses, a brow bar and a nose bridge, the brow bar and nose bridge serving to space the lenses apart and cooperating with a section of each of the lens frames to define a four-sided opening of the prescription glasses, said sun shade device including:

a pair of sun shades;

means for connecting said pair of sun shades together in spaced apart orientation;

means for releasably attaching said sun shade device to the prescription glasses with said pair of sun shades positioned over respective ones of the lenses, said attaching means including a wire-like member configured and arranged to be inserted through the opening of the prescription glasses to effect a snap-fit connection with one of the brow bar or nose bridge and to engage the four sides of that opening to substantially preclude movement of said sun shade device relative to the prescription glasses in any direction along the general plane of that opening wherein: said wire-like member includes opposite ends attached to said connecting means and extending rearwardly therefrom to make respective substantially right angle turns to define a pair of first corners and then respective reverse substantially right angle turns to define a pair of second corners, and then defines a middle forwardly extending U-shaped tongue-like portion, said second corners serving to snap-fit with one of the brow bar or nose bridge with the force exerted on said U-shaped tongue-like portion by the other of the brow bar or nose bridge acting through said wire-like member to increase the strength of said snap-fit connection.

16. The sun shade device of claim 15 wherein: said pair of first corners of said wire-like member are aligned with respective corners of the opening in the prescription glasses defined by one of the lens frame sections and one of the brow bar or nose bridge, whichever is not in contact with said U-shaped tongue-like portion of said wire-like member, and the force exerted on said U-shaped tongue-like portion by the other of the brow bar or nose bridge acts through said wire-like member to urge said first corners thereof into the respectively aligned corners of the prescription glasses opening.

* * * * *